(12) United States Patent
O'Rorke et al.

(10) Patent No.: US 11,203,978 B2
(45) Date of Patent: Dec. 21, 2021

(54) DUAL PUMP UNIT WITH BOOST PUMP

(71) Applicant: Hamilton Sundstrand Corporation, Charlotte, NC (US)

(72) Inventors: Morgan O'Rorke, West Hartford, CT (US); Charles E. Reuter, Granby, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 32 days.

(21) Appl. No.: 16/747,355

(22) Filed: Jan. 20, 2020

(65) Prior Publication Data

US 2021/0222625 A1 Jul. 22, 2021

(51) Int. Cl.
*F02C 7/00* (2006.01)
*F02C 7/236* (2006.01)
*F02C 7/232* (2006.01)

(52) U.S. Cl.
CPC .............. *F02C 7/236* (2013.01); *F02C 7/232* (2013.01)

(58) Field of Classification Search
None
See application file for complete search history.

(56) References Cited

U.S. PATENT DOCUMENTS

| | | | | |
|---|---|---|---|---|
| 3,332,234 A | * | 7/1967 | Lavash | F04C 14/02 60/39.281 |
| 3,589,836 A | * | 6/1971 | Danker | F04D 13/14 417/47 |
| 3,738,107 A | * | 6/1973 | Miller | F02K 3/10 60/241 |
| 2003/0136103 A1 | | 7/2003 | Rueter et al. | |
| 2010/0089025 A1 | | 4/2010 | Baker | |
| 2010/0242431 A1 | | 9/2010 | Baker | |
| 2012/0271527 A1 | * | 10/2012 | Zebrowski | F02C 9/30 701/100 |
| 2014/0196463 A1 | | 7/2014 | Zielinski et al. | |
| 2015/0101339 A1 | * | 4/2015 | Veilleux, Jr. | F02C 7/236 60/772 |
| 2017/0167387 A1 | | 6/2017 | Weir et al. | |
| 2017/0306856 A1 | | 10/2017 | Bickley | |
| 2018/0313271 A1 | * | 11/2018 | Chalaud | F04D 27/009 |
| 2019/0112987 A1 | | 4/2019 | O'Rorke et al. | |
| 2020/0318539 A1 | * | 10/2020 | Mailander | B01D 19/0005 |

FOREIGN PATENT DOCUMENTS

| | | |
|---|---|---|
| EP | 2500551 A2 | 9/2012 |
| EP | 2500552 A2 | 9/2012 |

OTHER PUBLICATIONS

Extended European Search Report for EP Application No. 20205728.7, dated Apr. 9, 2021, 7 pages.

* cited by examiner

*Primary Examiner* — Edwin Kang
(74) *Attorney, Agent, or Firm* — Kinney & Lange, P.A.

(57) ABSTRACT

A fuel supply system for a gas turbine engine includes a fuel tank, a pumping unit downstream of the fuel tank and configured to receive fuel from the fuel tank, and a sharing valve downstream of the pumping unit and configured to receive fuel from the cruise pump of the pumping unit during a first operating condition. The pumping unit includes a boost pump, an actuation pump downstream of the boost pump and in fluid communication with at least one actuator of the gas turbine engine, and a cruise pump downstream of the boost pump and in fluid communication with nozzles of a gas generator of the gas turbine engine.

20 Claims, 2 Drawing Sheets

DUAL PUMP UNIT WITH BOOST PUMP

BACKGROUND

The disclosed subject matter relates to a gas turbine engine fuel system, and more particularly, to a fuel system having a dual pump unit with a boost pump.

Aircraft fuel supply pumps must be sufficiently powerful to meet the greatest operating demands of the aircraft during a flight schedule. Depending on the type of aircraft, a higher-demand operation might include climbing and/or high-speed maneuvering, while a lower-demand operation would be cruise conditions. Conventional pumping systems use single pumps sized to meet the requirements of higher-demand operations. Such pumps add weight and can require higher power extraction from the engine and increase the temperature of the fuel.

SUMMARY

A fuel supply system for a gas turbine engine includes a fuel tank, a pumping unit downstream of the fuel tank and configured to receive fuel from the fuel tank, and a sharing valve downstream of the pumping unit and configured to receive fuel from the cruise pump of the pumping unit during a first operating condition. The pumping unit includes a boost pump, an actuation pump downstream of the boost pump and in fluid communication with at least one actuator of the gas turbine engine, and a cruise pump downstream of the boost pump and in fluid communication with nozzles of a gas generator of the gas turbine engine.

A method of operating a fuel supply system of a gas turbine engine includes providing a first fuel flow from a fuel tank to a pumping unit during a first operating condition. The pumping unit includes a boost pump, an actuation pump downstream of the boost pump, and a cruise pump downstream of the boost pump. The method further includes providing a second fuel flow from the cruise pump of the pumping unit to a sharing valve during the first operating condition, and providing the second fuel flow from the sharing valve to nozzles of a generator of the gas turbine engine during the first operating condition.

Figure 1:
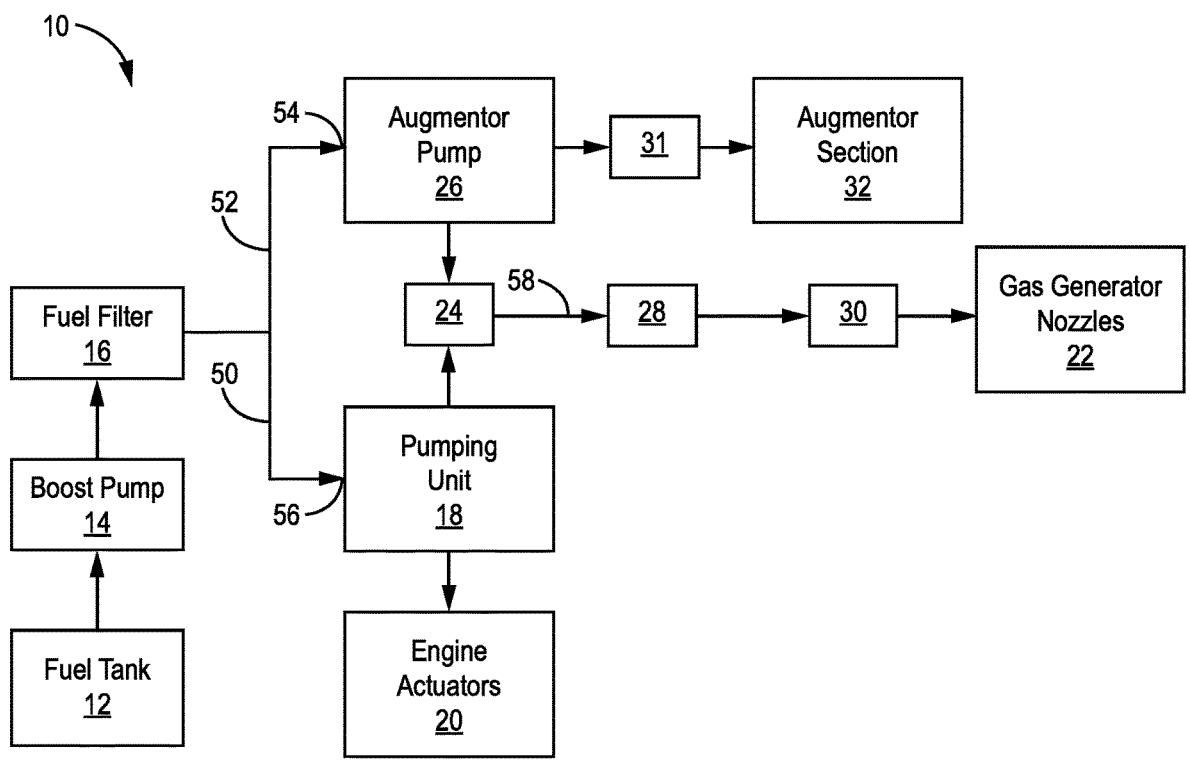
FIG. 1 schematically illustrates a fuel supply system for a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A fuel supply system having a dual-pump main pumping unit is disclosed herein. The main pumping unit includes two positive displacement pumps—a cruise pump and an actuation pump—and an associated boost pump. The cruise pump supplies engine fuel flow for combustion, while the actuation pump supplies fuel to actuating components of the engine. The actuation pump can be sized to provide a higher-pressure flow required for actuation, while the cruise pump can be a relatively lower pressure pump sufficient to provide cruise condition fuel flow to the fuel nozzles. Further, the arrangement of the pumping unit allows for scheduling of the cruise and actuation pump pressures. The fuel system can include an augmentor pump activatable for high fuel demand operations. The augmentor pump fuel flow and cruise pump fuel flow can be managed by a pump sharing valve.

FIG. 1 is a schematic illustration of fuel system 10 for a gas turbine engine. As shown in FIG. 1, system 10 includes fuel tank 12 in fluid communication with first boost pump 14, fuel filter 16, and pumping unit 18. First boost pump 14 can be a centrifugal pump used to increase the pressure of the fuel flow from fuel tank 12, and fuel filter can remove contaminants from the fuel flow. Pumping unit 18 can supply fuel to one or more engine actuators 20 (e.g., actuatable vanes, valves, nozzles, etc.), as well as to gas generator nozzles 22. Pumping unit 18 can be driven by the gas turbine engine via an engine gearbox (not shown) turning at a rate proportional to engine speed. Pump sharing valve 24 is in fluid communication with both pumping unit 18 and augmentor pump 26, and can manage fuel flow from each. Fuel output from pump sharing valve 24 can be provided to fuel oil cooler 28 and fuel metering unit 30 before being provided to either of nozzles 22 to be used for ignition. In certain (e.g., military) operating conditions requiring significant thrust (not discussed herein), augmentor pump 26 can output fuel to augmentor section 32 via augmentor fuel control unit 31. The operation of fuel system 10 is discussed below in greater detail.

Figure 2:
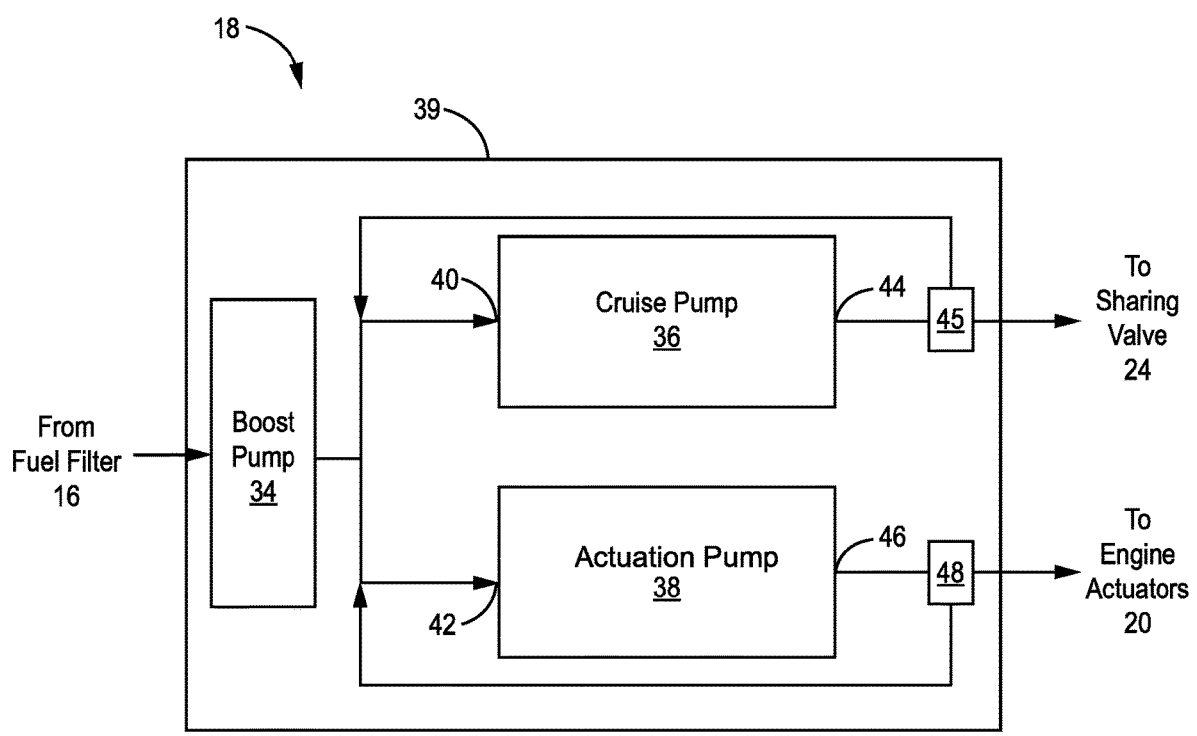
FIG. 2 schematically illustrates a pumping unit of the fuel supply system.

FIG. 2 is a schematic illustration of pumping unit 18. As shown in FIG. 2, pumping unit 18 includes a second boost pump 34 in fluid communication with inlet 40 of cruise pump 36 and inlet 42 of actuation pump 38. Second boost pump 34 can be a centrifugal boost pump configured to further boost the pressure of fuel flow to the pumps 36 and/or 38. Each of cruise pump 36 and actuation pump 38 can be a positive displacement pump, such as a gear pump. Cruise pump 36 can deliver fuel ultimately bound for nozzles 22 to sharing valve 24 through outlet 44. A first pressure regulating valve 45 can be included downstream of cruise pump 36 to schedule a regulated pressure to the sharing valve 24. Actuation pump 38 can deliver fuel to actuators 20 from outlet 46 as is discussed below in greater detail below. A second pressure regulating valve 48 can be included downstream of actuation pump 38 to schedule a regulated pressure to engine actuators 20. Pressure regulation of either/both of cruise pump 36 and actuation pump 38 can be variable and can be controller-operated as a function of engine operating conditions with a servo valve (not shown). In the embodiment shown, second boost pump 34, cruise pump 36, and actuation pump 38 are collocated in common housing 39, although in alternative embodiments, one or more components may be arranged in a separate housing, based on factors such as spatial constraints.

Referring to FIGS. 1 and 2, a first operating condition of the gas turbine engine can be a relatively low-demand condition such as idle or a steady-state cruise condition. In such a condition, cruise pump 36 and actuation pump 38 are sized to satisfy all engine demands and fuel flow from fuel tank 12 can be provided to pumping unit 18 via line 50. Augmentor pump 26 can be in an "off" position such that it receives no fuel flow from fuel tank 12, although line 52 to augmentor pump 26 may still receive fuel. In one embodiment, augmentor pump 26 can, like pumping unit 18, be driven by an engine gearbox, and can be maintained in the "off" position by keeping inlet 54 closed and evacuating any fuel within the pump. Augmentor pump 26 can still be considered to be in the "off" position even if it continues to run with a closed inlet 54. Augmentor pump 26 can alternatively be a motor-driven pump, and the "off" position in such a pump can represent the motor in an "off" position. In either case, the "off" position can be signaled by electronic control means (not shown).

During low-demand conditions, pumping unit 18 can receive most/all the fuel flow from fuel tank 12 via line 50 and inlet 56. As was discussed above with regard to FIG. 2, second boost pump 34 can be positioned to receive fuel flow from fuel tank 12 (also passing through boost pump 14 and fuel filter 16), and subsequently provide the fuel flow to cruise pump 36 and/or actuation pump 38. Second boost pump 34 can reduce pressure rise across cruise pump 36 and actuation pump 38 because it increases (boosts) the pressure of fuel flow coming from fuel filter 16 such that there is less of a disparity between inlet 40, 42 pressures and pressure at outlets 44, 46 of either or both of cruise pump 36 and actuation pump 38, respectively. Reducing pressure rise helps maintain key parameters of the positive displacement cruise and actuation pumps of pumping unit 18, such as bearing loads and gear scoring. This can help prevent performance issues and pump degradation related to pressure rise.

Cruise pump 36 can be configured to be the primary provider of fuel flow to gas generator nozzles 22 in the low-demand state of the engine. Fuel flow provided to pumping unit 18 and cruise pump 36 can subsequently be provided to sharing valve 24. In such an operating condition, the cruise pump fuel flow can be the only fuel received by sharing valve 24, as augmentor pump 26 can be in the "off" position. Cruise pump 36 fuel flow then travels along line 58 through fuel oil cooler 28 which can use the relatively cooler fuel flow to cool various engine lubricants, and fuel metering unit 30, which schedules fuel flow to nozzles 22.

A second operating condition of the gas turbine engine can be a relatively high-demand condition such as high-speed propulsion or other maneuvering. Such a condition can exceed the operation capabilities of cruise pump 36 such that augmentor pump 26 is needed to provide additional fuel to nozzles 22 to generate additional thrust. Accordingly, augmentor pump 26 can be switched to an "on" position (e.g., by opening inlet 54 or activating the motor of augmentor pump 26, depending on the embodiment), and fuel flow from fuel tank 12 can be provided to each of pumping unit 18 and augmentor pump 26. During high-demand operations, sharing valve 24 can receive and combine fuel flow from cruise pump 36 of pumping unit 18 and augmentor pump 26. In this sense, sharing valve 24 can be a two-state valve that can, in some conditions, manage a single fuel flow (e.g., from cruise pump 36 in a low-demand state) and in high-demand operating conditions, modulate in a second state to manage multiple fuel flows (e.g., from augmentor pump 26 and cruise pump 36 in a high-demand state). Sharing valve 24 can provide the combined fuel flow along line 58 through fuel oil cooler 28 and fuel metering unit 30 to nozzles 22, as generally discussed above.

A third operating condition can be actuation conditions, which can occur during either or both of the first (low-demand) and second (high-demand) operating conditions, although actuation fuel flow can be smaller than cruise pump fuel flow in a steady-state condition. Actuation conditions can include, for example, acceleration and/or deceleration of the engine. During an actuation condition, actuation pump 38 can provide an amount of fuel flow from fuel tank 12 to engine actuators 20. Engine actuators 20 can require a higher-pressure fuel flow from pump 38 than, for example, nozzles 22 require from cruise pump 36. In some instances, actuators 20 can require a fuel flow pressure that is two to three times greater than the fuel flow pressure required by nozzles 22, thus, actuation pump 38 fuel flow can be at a higher pressure than cruise pump 26 fuel flow. Actuation pump 38 is accordingly sized to satisfy quiescent and slew flow requirements of actuators 20, and can further be rated for higher pressure output than cruise pump 36. In this regard, the implementation of second boost pump 34 is particularly useful for reducing pressure rise due to the higher-pressure output of actuation pump 38.

The disclosed fuel supply system has many benefits. Having individual cruise and actuation pumps 36, 38 can increase system and engine efficiency. Cruise pump 36 can be sized specifically to meet the requirements of low-demand conditions at which the engine spends most of its time. This requires less power extraction from the engine and can help keep fuel temperatures relatively low. This is beneficial as fuel can be used to cool other engine systems. In previous systems, high fuel temperatures often limited engine performance. Actuation pump 38 can be sized specifically to meet the high-pressure requirements of engine actuators. Engine actuator force ($F_A$) is a function of fuel pressure (P) and actuator area (A) as represented by ($F_A$=PA). Thus, a pump configured to provide a relatively high-pressure flow allows for the use of smaller (and potentially lighter) actuators. Second boost pump 34 helps limit pressure rise across the cruise (36) and actuation (38) pumping stages.

It should be understood that various other embodiments of fuel supply system 10 are possible. For example, fuel supply system 10 can include other features (e.g., valves, pumps, controllers, etc.) not shown in the figures. Further, in an alternative embodiment, augmentor pump 26 can be a type of stand-by pump activatable during certain operating conditions and/or a pump failure. Another alternative embodiment can exclude augmentor pump 26 and augmentor section 32. The disclosed fuel supply system can be implemented in engines used in both military and commercial aircraft, and can have additional applications in industrial and other types of gas turbine engines.

Discussion of Possible Embodiments

The following are non-exclusive descriptions of possible embodiments of the present invention.

A fuel supply system for a gas turbine engine includes a fuel tank, a pumping unit downstream of the fuel tank and configured to receive fuel from the fuel tank, and a sharing valve downstream of the pumping unit and configured to receive fuel from the cruise pump of the pumping unit during a first operating condition. The pumping unit includes a boost pump, an actuation pump downstream of the boost pump and in fluid communication with at least one actuator of the gas turbine engine, and a cruise pump downstream of the boost pump and in fluid communication with nozzles of a gas generator of the gas turbine engine.

The fuel supply system of the preceding paragraph can optionally include, additionally and/or alternatively, any one or more of the following features, configurations and/or additional components:

The above fuel supply system can further include an augmentor pump downstream of the fuel tank and configured to receive fuel from the fuel tank during a second operating condition.

In any of the above fuel supply systems, the sharing valve can be downstream of the augmentor pump and configured to receive fuel from the augmentor pump during the second operating condition.

In any of the above fuel supply systems, the sharing valve can further be configured to combine an augmentor pump fuel flow and a cruise pump fuel flow during the second operating condition.

In any of the above fuel supply systems, the first operating condition can be a low-demand condition of the gas turbine engine, and the second operating condition can be a high-demand condition of the gas turbine engine, the high-demand condition requiring a greater amount of fuel for the nozzles than the low-demand condition.

In any of the above fuel supply systems, the actuation pump and the cruise pump can be positive displacement gear pumps.

In any of the above fuel supply systems, the boost pump can be a centrifugal pump.

In any of the above fuel supply systems, the boost pump, the actuation pump, and the cruise pump can be collocated in a common housing within the fuel supply system.

In any of the above fuel supply systems, the pumping unit can further include a pressure regulating valve in communication with the actuation pump or the cruise pump.

Any of the above fuel supply systems can further include a boost pump downstream of the fuel tank and upstream of the pumping unit, and a fuel filter downstream of the boost pump and upstream of the pumping unit.

In any of the above fuel supply systems, the actuation pump can be configured to deliver fuel to the at least one actuator during a third operating condition.

In any of the above fuel supply systems, the third operating condition is an actuation condition of the gas turbine engine.

A method of operating a fuel supply system of a gas turbine engine includes providing a first fuel flow from a fuel tank to a pumping unit during a first operating condition. The pumping unit includes a boost pump, an actuation pump downstream of the boost pump, and a cruise pump downstream of the boost pump. The method further includes providing a second fuel flow from the cruise pump of the pumping unit to a sharing valve during the first operating condition, and providing the second fuel flow from the sharing valve to nozzles of a generator of the gas turbine engine during the first operating condition.

The method of the preceding paragraph can optionally include, additionally and/or alternatively, any one or more of the following features, configurations and/or additional components:

The above method can further include providing a third fuel flow from the fuel tank to an augmentor pump during a second operating condition, and providing the third fuel flow from the augmentor pump to the pump sharing valve during the second operating condition.

Any of the above methods can further include combining the second fuel flow from the cruise pump and the third fuel flow from the augmentor pump using the sharing valve during the second operating condition.

In any of the above methods, the first operating condition can be a low-demand condition of the gas turbine engine, and the second operating condition can be a high-demand condition of the gas turbine engine.

In any of the above methods, the sharing valve may not receive the third fuel flow from the augmentor pump during the first operating condition.

Any of the above methods can further include providing a fourth fuel flow from the actuation pump of the pumping unit to an actuator of the gas turbine engine during a third operating condition.

In any of the above methods, the third operating condition can be an actuation condition of the gas turbine engine.

In any of the above methods, the fourth fuel flow from the actuation pump can have a higher pressure than the second fuel flow from the cruise pump.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel supply system for a gas turbine engine comprising:
   a fuel tank located on a main fuel line;
   an augmentor pump located on an augmentor pump line and downstream of the fuel tank;
   a pumping unit downstream of the fuel tank and configured to receive fuel from the fuel tank, the pumping unit comprising:
      a pumping unit boost pump located on a pumping unit boost pump line;
      an actuation pump located on an actuation pump line and downstream of the pumping unit boost pump and in fluid communication with at least one actuator of the gas turbine engine; and
      a cruise pump located on a cruise pump line and downstream of the pumping unit boost pump and in fluid communication with nozzles of a gas generator of the gas turbine engine; and
   a sharing valve downstream of the pumping unit and configured to receive the fuel from the cruise pump of the pumping unit during a first operating condition,
   wherein the augmentor pump line and the pumping unit boost pump line branch from the main fuel line in a first parallel arrangement; and
   wherein the actuation pump line and the cruise pump line branch from the pumping unit boost pump line in a second parallel arrangement.

2. The fuel supply system of claim 1, wherein the augmentor pump downstream of the fuel tank is configured to receive the fuel from the fuel tank during a second operating condition.

3. The fuel supply system of claim 2, wherein the sharing valve is downstream of the augmentor pump and is configured to receive the fuel from the augmentor pump during the second operating condition.

4. The fuel supply system of claim 3, wherein the sharing valve is further configured to combine an augmentor pump fuel flow and a cruise pump fuel flow during the second operating condition.

5. The fuel supply system of claim 3, wherein the first operating condition is a low-demand condition of the gas turbine engine, and wherein the second operating condition is a high-demand condition of the gas turbine engine, the high-demand condition requiring a greater amount of the fuel for the nozzles than the low-demand condition.

6. The fuel supply system of claim 1, wherein the actuation pump and the cruise pump are positive displacement gear pumps.

7. The fuel supply system of claim 1, wherein the pumping unit boost pump is a centrifugal pump.

8. The fuel supply system of claim 1, wherein the pumping unit boost pump, the actuation pump, and the cruise pump are collocated in a common housing within the fuel supply system.

9. The fuel supply system of claim 1, wherein the pumping unit further comprises a pressure regulating valve in communication with the actuation pump or the cruise pump.

10. The fuel supply system of claim 1 and further comprising:
 a boost pump downstream of the fuel tank and upstream of the pumping unit; and
 a fuel filter downstream of the boost pump and upstream of the pumping unit.

11. The fuel supply system of claim 1, wherein the actuation pump is configured to deliver the fuel to the at least one actuator during a third operating condition.

12. The fuel supply system of claim 11, wherein the third operating condition is an actuation condition of the gas turbine engine.

13. A method of operating a fuel supply system of a gas turbine engine, the method comprising:
 providing a first fuel flow from a fuel tank located on a main fuel line to a pumping unit during a first operating condition, the pumping unit comprising:
  a pumping unit boost pump located on a pumping unit boost pump line;
  an actuation pump located on an actuation pump line and downstream of the pumping unit boost pump; and
  a cruise pump located on a cruise pump line and downstream of the pumping unit boost pump;
 providing a second fuel flow from the cruise pump of the pumping unit to a sharing valve during the first operating condition;
 providing the second fuel flow from the sharing valve to nozzles of a generator of the gas turbine engine during the first operating condition; and
 providing an augmentor pump located on an augmentor pump line and downstream of the fuel tank,
 wherein the augmentor pump line and the pumping unit boost pump line branch from the main fuel line in a first parallel arrangement; and
 wherein the actuation pump line and the cruise pump line branch from the pumping unit boost pump line in a second parallel arrangement.

14. The method of claim 13 and further comprising:
 providing a third fuel flow from the fuel tank to the augmentor pump during a second operating condition; and
 providing the third fuel flow from the augmentor pump to the sharing valve during the second operating condition.

15. The method of claim 14 and further comprising:
 combining the second fuel flow from the cruise pump and the third fuel flow from the augmentor pump using the sharing valve during the second operating condition.

16. The method of claim 15, wherein the first operating condition is a low-demand condition of the gas turbine engine, and wherein the second operating condition is a high-demand condition of the gas turbine engine.

17. The method of claim 14, wherein the sharing valve does not receive the third fuel flow from the augmentor pump during the first operating condition.

18. The method of claim 13 and further comprising:
 providing a fourth fuel flow from the actuation pump of the pumping unit to an actuator of the gas turbine engine during a third operating condition.

19. The method of claim 18, wherein the third operating condition is an actuation condition of the gas turbine engine.

20. The method of claim 18, wherein the fourth fuel flow from the actuation pump has a higher pressure than the second fuel flow from the cruise pump.

* * * * *